United States Patent [19]
Uhlig

[11] 3,989,784
[45] Nov. 2, 1976

[54] METHOD OF MAKING BLOW MOLDED PLASTIC ARTICLES

[75] Inventor: Albert R. Uhlig, Toledo, Ohio

[73] Assignee: Owens-Illinois, Inc., Toledo, Ohio

[22] Filed: Apr. 7, 1975

[21] Appl. No.: 566,016

Related U.S. Application Data

[63] Continuation-in-part of Ser. No. 402,888, Oct. 3, 1973, abandoned.

[52] U.S. Cl. .................................. 264/89; 264/98; 264/296; 264/327; 425/DIG. 208; 425/DIG. 214; 425/DIG. 215
[51] Int. Cl.² .......................................... B29C 17/07
[58] Field of Search ................... 264/89, 90, 92, 94, 264/96, 99, 296, 327; 425/DIG. 208, DIG. 214, DIG. 215

[56] References Cited
UNITED STATES PATENTS
2,336,822   12/1943   Wadman ........................ 264/94 UX

FOREIGN PATENTS OR APPLICATIONS
38-8583   6/1963   Japan

*Primary Examiner*—Jan H. Silbaugh
*Attorney, Agent, or Firm*—Cullen, Settle, Sloman & Cantor

[57] ABSTRACT

A method of making blown plastic articles of non-circular cross-section, having convex exterior portions, such as a bottle of rectangular or oval shape, or having localized protuberances. The article is blown from a pre-form of inverted shape, i.e., the convex article portions are formed from concave pre-form portions. Also, the concave, pre-form portions are of increased thickness to compensate for their greater subsequent expansion during blowing.

During final blowing, the non-convex portions of the article are first formed against the mold cavity-thereby stabilizing the partly blown pre-form in the blow mold cavity-and the concave pre-form portions are then blown to their final convex shape to complete the article.

11 Claims, 16 Drawing Figures

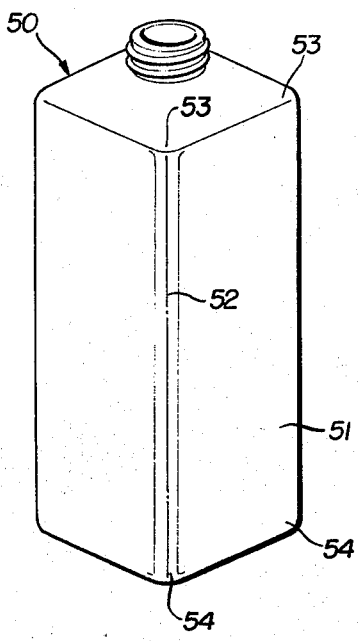
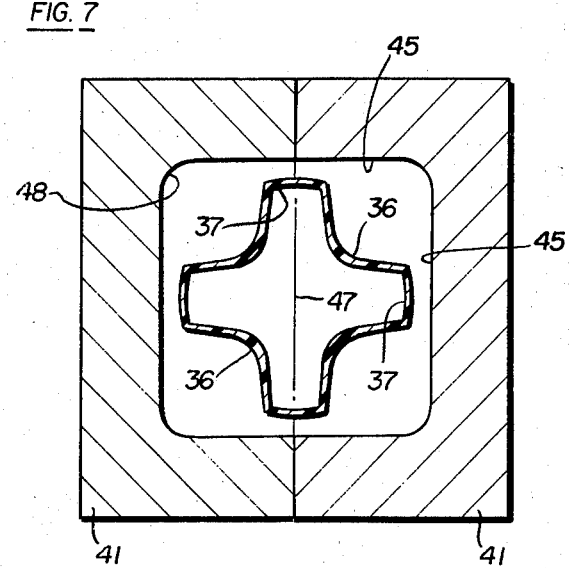
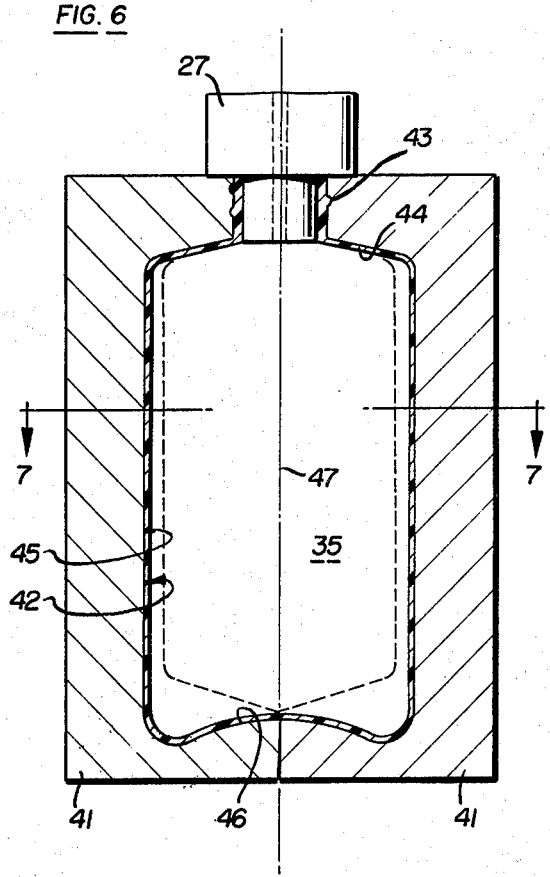
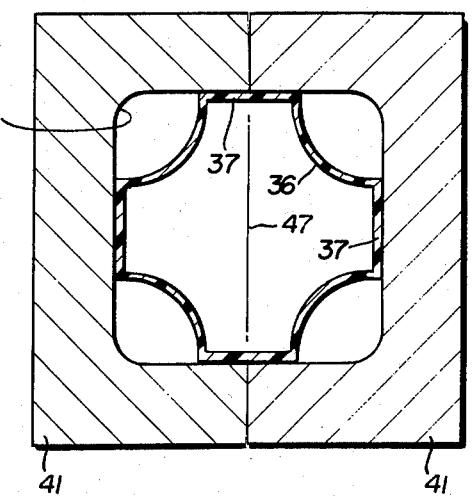
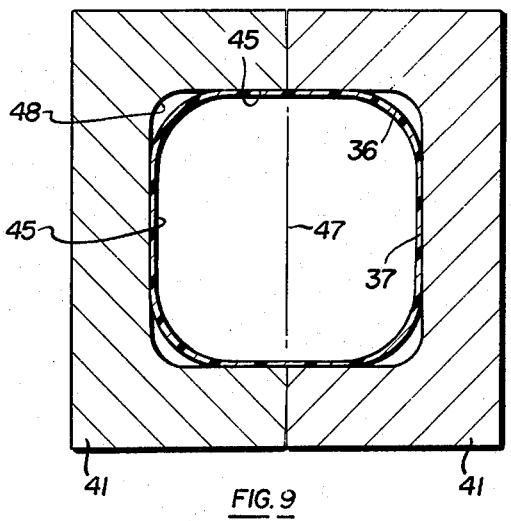

METHOD OF MAKING BLOW MOLDED PLASTIC ARTICLES

CROSS-REFERENCE TO RELATED APPLICATIONS

This is a continuation-in-part of copending application Ser. No. 402,888 filed Oct. 3, 1973, now abandoned.

BACKGROUND OF THE INVENTION

In the manufacture of blow molded plastic articles of irregular cross-section, the attainment of proper material distribution throughout the walls has always been a problem. In such irregular shapes, the outermost portions of the article, for example, the corners of a rectangular bottle, are formed from plastic which is "blown-up" to a greater extent than are the side panels of the bottle. As a result, the corners of such bottles are thinner and weaker.

This problem also exists in oval bottles, in bottles having handle-receiving protuberances, and the like.

Various solutions for this problem have been proposed in the prior art, including the extrusion or injection molding of blowable parisons of non-tubular shape conforming to the shape of the container to be finally formed. However, these solutions have been costly and complicated, since the formation of a parison of varied wall thickness, of oval configuration, and the like, requires complicated, matched tooling, constant maintenance, skilled set-up and the like. Further, the thicker portions of a differential thickness parison do not blow up at the same rate as the center parison portions, and the blowing of the various parison portions to the exact, corresponding, desired portion of the final container is difficult and unpredictable.

U.S. Pat. No. 2,336,822 to Wadman discloses a method and apparatus for forming hollow glassware by chilling portions of a glass parison prior to formation of the final article. This results in a "pre-form" which is chilled and expanded in the open air to form cooler peripheral portions which are stretched to the convex corners portions of the blow mold. Thus, in Wadman, that portion of the pre-form which is stretched the most is the coldest.

BRIEF SUMMARY OF THE PRESENT INVENTION

The present invention now proposes a new and novel solution to the manufacture of blown plastic articles of non-circular or irregular cross-section, particularly to the manufacture of plastic articles having convex exterior portions. Essentially, the present invention proposes the blowing of an intermediate, blowable pre-form of inverted shape relative to the final article and having walls of varying thickness as correlated with the shape of the pre-form and with the shape of the final article.

More particularly, by the method of the present invention, an initial parison, preferably tubular and made by either free extrusion or injection molding techniques, is blown to a configuration in which the pre-form is provided with concave, thickened portions which are destined to become the convex portions of the final article. During the formation of the pre-form itself, the parison is inflated differentially to form alternate convex and concave portions. Since the concave portions of the parison are inflated to a lesser extent than the convex portions, the concave portions necessarily are of greater thickness than the remaining portions of the parison. These thicker concave portions are inherently hotter than the convex portions.

The blown pre-form is enclosed in a final blow mold having interior walls defining a cavity conforming to the shape of the final article, the pre-form and the mold cavity being longitudinally co-axial and the concave, thickened portions of the pre-form being radially aligned with the convex portions of the final article. The final blow molding operation then is carried out.

The inflation parison is progressive, although quite rapidly carried out, with the non-concave portions of the parison first contacting the final mold cavity walls due to (1) their lesser wall thickness and (2) their closer proximity to the cavity walls. This initial pre-form contact with the cavity mold walls fixes the wall thickness of these portions of the final article and stabilizes the pre-form relative to the cavity.

Continued progressive inflation of the pre-form "unfolds" the thicker concave portions through a transition shape to a convex shape as the initially concave portions progressively contact the cavity mold walls toward the remote convex portions of the final article. During this progressive inflation, the initially concave portions of the pre-form become thinner and thinner until the convex portions of the article are finally formed. Assuming that the pre-form was properly proportioned to the final article, the wall thickness of the same finally blown convex portions of the article will be substantially the same as the wall thickness of the remainder of the article.

The multiple advantages of the process of the present invention will be readily appreciated. First, the pre-form is easily and quickly formed from a simple tubular parison, eliminating expensive and complicated parison tooling. Additionally, the concave portions of the blown pre-form are inherently thicker than the remainder of the pre-form, since the concave portions of the pre-form are closer to the original tubular parison shape and are inflated to a lesser extent during the pre-form blowing operation. Further, the thicker concave portions are inherently hotter than the convex portions; this is significant because these concave portions are expanded the most during the formation of the final article.

Other advantages accrue during the final blowing operation. The stabilization of the pre-form internally of the blow mold cavity can be readily appreciated. This means that (1) the concave pre-form portions necessarily are aligned with and carry into the extreme convex portions of the final container, (2) the progressive thinning of the initially thicker concave portions increases the final wall thickness at the convex portions, and (3) the shoulders and heels of a container are similarly reinforced over those known in the prior art.

OBJECTS OF THE PRESENT INVENTION

It is therefore, an important object of the present invention to provide a method of making blown plastic articles of convex configuration by forming a blown pre-form having concave thickened portions corresponding to the location of the convex article portions and inflating the pre-form to progressively form the article with the concave pre-form portions being blown into and forming the convex article portions.

Another important object of this invention is the provision of a method of making a plastic article having convex portions by blowing a pre-form of inverted shape relative to the final article and of differential wall thickness, and progressively inflating the pre-form in a final blow mold to form the final article having the convex portions and other portions thereof of substantially constant wall thickness.

It is yet another, and no less important, object to the present invention to provide a method of making a plastic article having convex exterior protions from an essentially cylindrical parison by blowing the parison into a pre-form, wherein those portions of the pre-form destined to form the convex portions of the final article are defined by inverted concave pre-form portions of greater wall thickness than the remainder of the pre-form, and then enclosing and blowing the pre-form in a final blow mold cavity conforming to the shape of the final article to first stabilize the pre-form to the convex shapes of the article with the convex article being of substantially the same wall thickness as other portions of the article.

BRIEF DESCRIPTION OF THE DRAWINGS

On the Drawings:

FIG. 6 is a vertical sectional view through a final blow mold utilizing the method of the present invention;

FIG. 7 is a horizontal sectional view taken along the plane 7—7 of FIG. 6 and illustrating the blown pre-form of FIG. 5, as enclosed in the final blow mold and prior to the final blowing step;

FIG. 8 is a view similar to FIG. 7 illustrating a first intermediate step in the progressive blowing of the pre-form of FIG. 5 to its final configuration;

FIG. 9 is a view similar to FIG. 8 showing the next successive step in the progressive blowing of the pre-form to its final configuration;

FIG. 10 is a perspective view of the final bottle made by the method illustrated in FIGS. 1–4 and 6–9, inclusive;

AS SHOWN ON THE DRAWINGS

Figure 1:
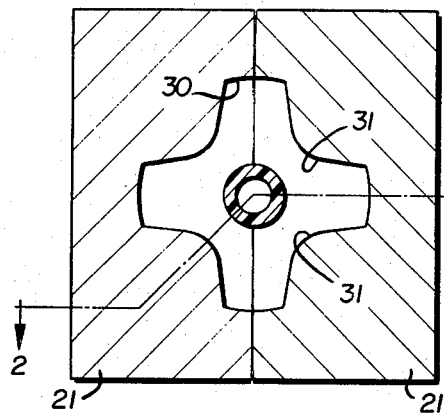
FIG. 1 is a horizontal sectional view of an initial step of the present invention illustrating a tubular, essentially cylindrical parison confined in a pre-formed mold.
Figure 3:
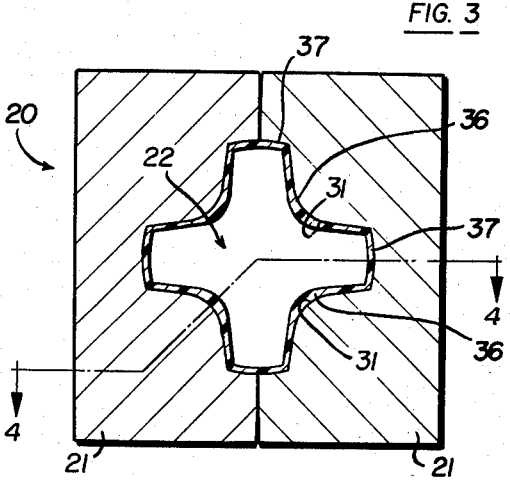
FIG. 3 is a view similar to FIG. 1 illustrating the blowing of the pre-form.
Figure 2:
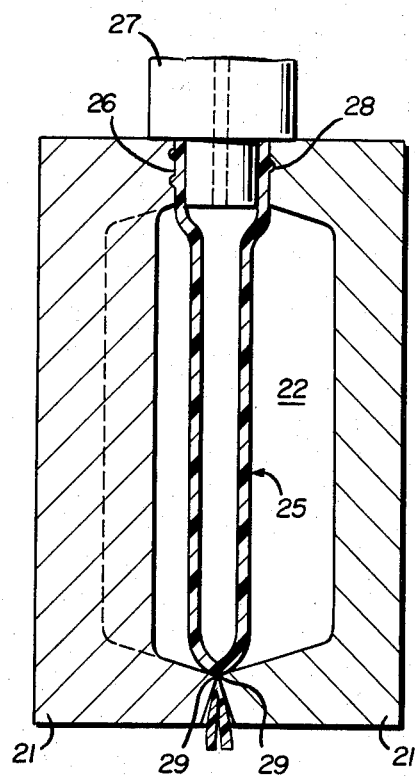
FIG. 2 is a vertical sectional view taken along the plane 2—2 of FIG. 1.
Figure 4:
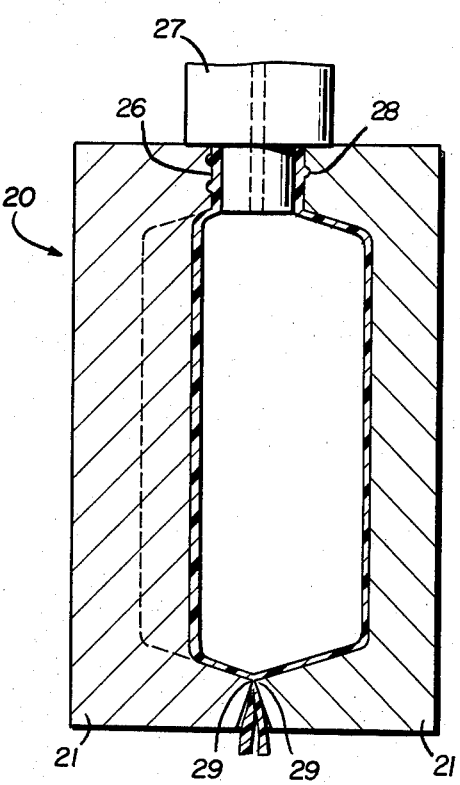
FIG. 4 is a vertical sectional view taken along the plane 4—4 of FIG. 3.

In FIGS. 1 and 2, reference numeral 20 refers generally to a pre-form blow mold comprising a pair of identical openable and closeable pre-form blow mold sections 21 cooperatively defining an interior pre-form blow mold cavity 22, all as is well known in the art. Disposed within the cavity 22 is a tubular parison 25 having its upper open end 26 compressed between an upper blow pipe 27 and a threaded, finish-defining portion 28 of the mold cavity 22. The lower open end of the tubular parison 26 is pinched shut by pinching projections 29 formed in the pre-form blow mold sections 21. The tubular parison, as illustrated, is of the freely extruded tubular type, although the present invention is equally applicable to an injection molded closed end, tubular parison. Both types are well known in the art and can be formed by well known prior art techniques.

Referring now to the mold cavity 22, it will be seen that the cavity 22 is cruciform in cross-sectional shape, rather than circular, as is conventional in the art. The mold cavity 22 is defined by alternate radially outwardly projecting recesses 30 and radially inwardly projecting protuberances 31 formed in the respective mold sections 21, the recesses 30 and the protuberances 31 being uniformly spaced around the longitudinal axis of the cavity 22 to be coaxial with the pinched parison 25 disposed therein as shown in FIGS. 1 and 2.

Figure 5:
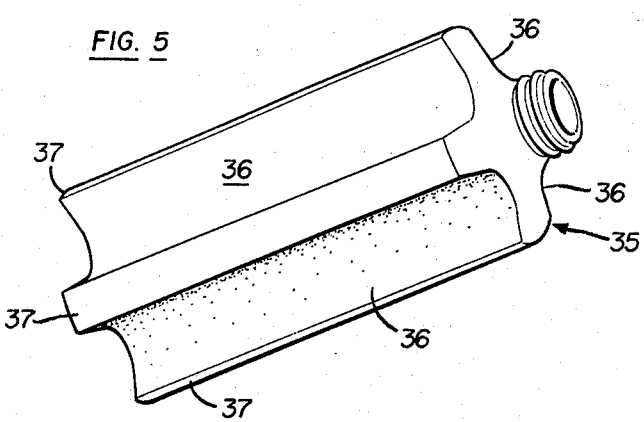
FIG. 5 is a perspective view of the blown pre-form made of the method illustrated in FIGS. 1–4.

Next, air is introduced through the blow tube 27 to inflate the parison 25 to the cruciform configuration of the mold cavity 22. This blowing operation, of course, inflates the parison 25 radially outwardly into contact with the walls of the cavity 22. Those portions of the tubular parison travelling into the axially extending recesses 30 travel a greater distance than those portions of the parison inflated against the axial protuberances 31. As a result of the shape of the cavity 22, the resultant pre-form of FIG. 5 is formed. The pre-form 5 includes alternate concave portions 36 and convex portions 37, the concave portions 36, which are formed against the radially inwardly extending protrusions 31, being of greater wall thickness than the convex portions 37. As will be hereinafter explained, the concave portions 36 of the pre-form 35 are destined to form the convex corners of the final article. Thus, the concave portions 36 are "inverted" with relation to their final blow molded configuration in the article being made. As will also be explained in greater detail hereinafter, the thicker concave pre-form portions are hotter than the thinner convex portions. Therefore, the portions of the pre-form which are stretched the most are the hottest.

Next, the blown pre-form 35 is transferred to the final blow mold 40 which comprises a pair of blow mold sections 41 cooperatively defining an interior blow mold cavity 42 of square cross-section (FIG. 7) conforming to the final bottle 50 illustrated in FIG. 10. The mold cavity 42 includes upper finish-defining surfaces 43, laterally extending shoulder defining surfaces 44, planar side wall surfaces 45 and concave bottom-defining surfaces 46. From FIG. 6 of the drawings, it will be seen that the pre-form 35 is substantially longitudinally coextensive with the blow cavity 42, the tail formed on the parison 25 when it was pinched shut by the pre-form mold portions 29 having been removed by well known means.

As illustrated in FIG. 7, the pre-form 35 is positioned in the mold cavity 42 so that the thicker, hotter concave portions 36 are aligned radially of the longitudinal axis 47 of both the cavity 42 and the pre-form 36 with the corners 48 which are convex and which are formed by the juncture of each pair of planar side walls 45 of the mold cavity 42. The convex protuberances 37 of the blown pre-form 35 are each aligned with the center portions of the planar side walls 45 of the mold cavity 42.

Next, air is introduced again through the blow pipe 27 to inflate the pre-form to the shape of the mold cavity 42 which corresponds to the shape of the final article 50. Although this inflation takes place very rapidly, generally within less than one second, the blowing is progressive as illustrated in and apparent from a comparison of FIGS. 7, 8 and 9. The first stage of inflation is illustrated in FIG. 8 of the drawings, wherein the pre-form is simply expanded in its original configuration until the protuberances 37 contact the side walls 45 of the mold to be thermally stabilized thereon at their expanded wall thickness. At this time, the pre-form is vertically stabilized interiorally of the mold cavity and is fixed against movement relative to the mold cavity.

Next, the concave portions 36 are inflated toward the corners 48, these portions 36, during such further inflation, being inverted from their original concave configuration to a final convex configuration as they approach the corners 48 of the mold cavity 42. Finally, the originally convex portions 36 travel outwardly into and fill the mold cavity corners 48.

From a comparison of FIGS. 5 and 10, it will be seen that the initially concave portions 36 of the parison 35 have been inflated and inverted outwardly to form the convex corners 52 of the bottle 50, with the side walls 51 of the container 50 being formed in part by the initially convex pre-form portions 37 and in part by the concave portions 36. The upper or shoulder corners 53 of the final container 50 and the lower, heel corners 54 of the container 50 are likewise formed of initially concave portions of the pre-form 35.

The importance of the differential thickness between the thinner convex portions 37 of the pre-form 35 and the relatively thicker concave portions 36 of the pre-form 35 can now be appreciated. In the blowing to the final bottle, the convex portions 37 travel a lesser distance to the side wall portions 45. Thus, the convex portions 37, during the final blowing, are (1) thinned to a lesser extent, and (2) strike the mold walls 45 prior to any contact of the concave portions 36 with the remainder of the mold, as clearly illustrated in FIGS. 8 and 9. Of course, any contact between the plastic of the pre-form and the mold walls immediately stabilizes the contacting plastic and fixes the wall thickness at that point.

Further, the contact between the protuberant or convex portions 37 with the mold side walls 45 stabilizes the pre-form in the mold cavity 42 and retains the still concave portions 36 alignment radially of the cavity axis with the mold cavity corner portions 48, thus facilitating greater outward expansion of the concave portions 36 to the corners 48. Since the concave portions 36 travel a greater distance to the areas of the corners 48, these portions are thinned to a greater extent than are the remaining portions 37 of the pre-form. However, the initially greater thickness of the concave portions 36 can be calculated and determined to yield a substantially constant or uniform overall wall thickness in the container, or even an increased thickness of the corners 52, if such is desired.

The thicker, concave parison portions are necessarily hotter than the thinner, convex parison portions because of the nature of the cooling action during the pre-form blowing. A hot blowable parison is cooled during a blowing cycle as a result of: (1) blowing air introduced into the parison and (2) the expanded, blown parison contacting the cooler mold wall surfaces. These two cooling actions are at the opposed pre-form surfaces and therefore develop a temperature gradient across the pre-form wall thickness. Thus, the center of the wall remains hotter than the chilled surfaces; and the center of a thinner pre-form portion is, of course, cooled to a lower temperature than the center of a thinner pre-form portion. After the pre-form is removed from the pre-form mold, the temperature across the wall thickness substantially equalizes, i.e. the temperature at the wall surface approaches that at the wall center due to conduction and the temperature gradient is reduced. As a result, the thicker wall portions are hotter than the thinner wall portions. This is significant because the thicker concave pre-form portions are expanded to a greater extent in the final blow mold.

For orientation, the temperature of both the concave and other pre-form portions will be within the orientation range for the final blowing operation.

Turning now to FIGS. 11–14, the utilization of the method of the present invention to form a bottle of completely different configuration than the bottle 50 is illustrated.

Figure 11:
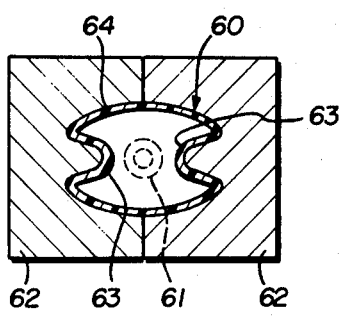
FIG. 11 is a horizontal sectional view through a pre-form blow mold similar to that of FIG. 1, but illustrating the formation of a preform for a different form of bottle.
Figure 12:
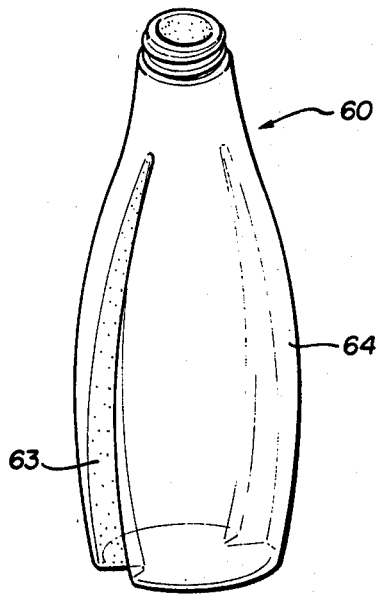
FIG. 12 is a perspective view of the blown pre-form made in accordance with FIG. 11.

As shown in FIG. 11, a pre-form 60 is blown from a tubular parison 61 in a pair of cooperating pre-form blow molds 62. The pre-form 60 is illustrated in FIG. 12 and is intended to form the bottle 70 of FIG. 14.

Figure 14:
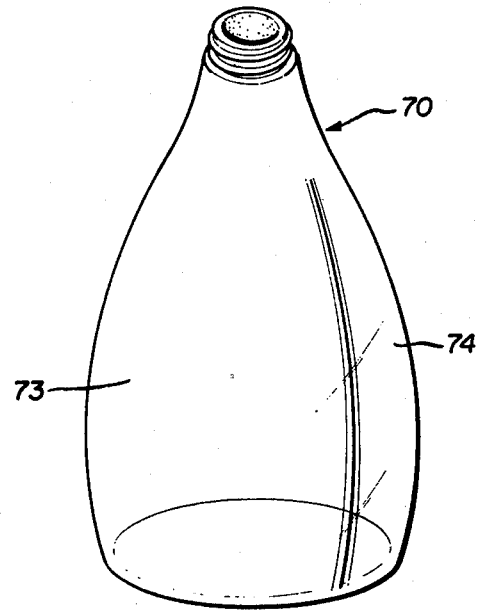
FIG. 14 is a perspective view of the final bottle made by a practice of the method of FIGS. 11–13, inclusive.

The bottle 70 of FIG. 14 is oval in configuration and has convex side walls at the extremities of the major axis of the oval cross-sectional shape. To make these convex extremities, the pre-form 60, as formed in the pre-form blow molds 62 is provided with concave portions 63 which are destined to form the sharply convex major axial portions 74 of the final bottle 70. The remainder of the parison is generally convex in shape as illustrated by the side wall 64 of the pre-form 60. Concave portions 62 will have the inherent characteristics previously discussed in relation to concave pre-form portions 36.

Figure 13:
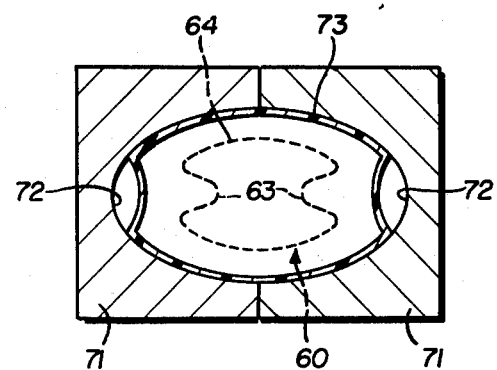
FIG. 13 is a horizontal sectional view taken through a final blow mold illustrating the inflation of the pre-form of FIG. 12 to its final bottle configuration.

After the pre-form 60 has been formed and while it is still blowable, the pre-form is transferred to a final blow mold consisting of blow mold sections 71 defining an interior blow mold cavity 72 which is oval in cross-section to correspond to the final shape of the bottle 70. The progressive inflation of the parison 60 to the final bottle shape is illustrated in FIG. 13, the convex side walls 64 of the pre-form 60 being first inflated into conformity with the side wall portions of the cavity 72 to form the bottle side walls 73. The concave end portions 63 of the parison, being thicker are the last portions of the pre-form to be expanded into contact with the mold cavity 72, thereby finally forming the convex wall extremities 74. All of the various considerations earlier discussed in connection with the embodiment of the invention illustrated in FIGS. 1 through 10 also apply to the embodiment of the invention illustrated in FIGS. 11-14, with the initially concave pre-form portions 63 being converted into the final convex major axial portions 74 of the container 70.

Figure 15:
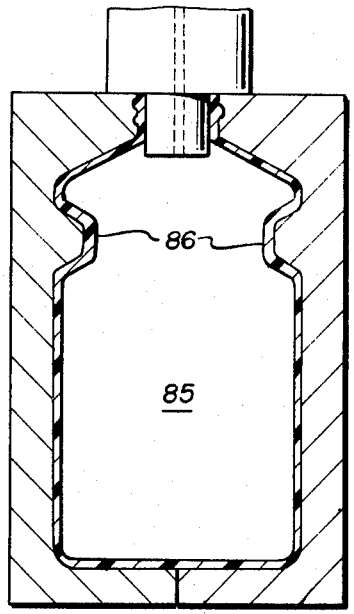
FIG. 15 is an elevational view of a different blown pre-form utilized for the manufacture of a different form of container having localized convex protuberances made from concave portions of the pre-form.
Figure 16:
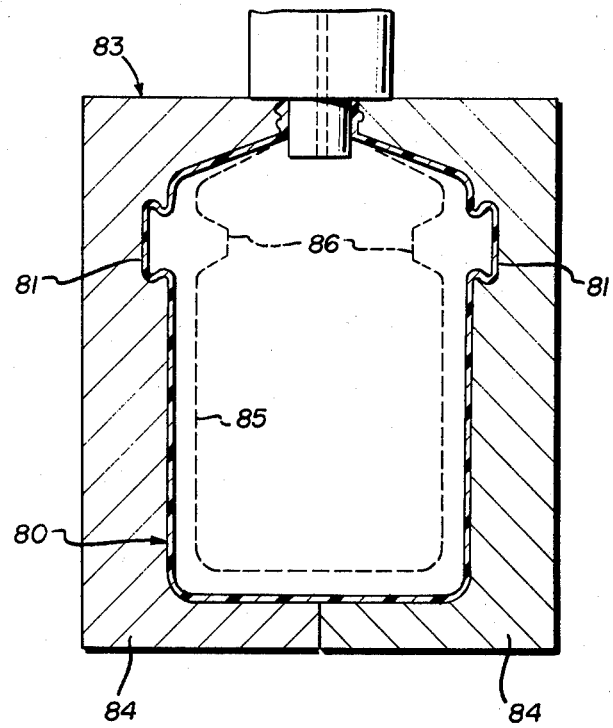
FIG. 16 is a vertical sectional view to prepare final blow molds for manufacturing a container having localized convex protuberances utilizing the pre-form of FIG. 15.

Yet another embodiment of the present invention is illustrated in FIGS. 15 and 16. Here, the bottle 80 is generally circular in cross-sectional configuration, but is provided with convex exterior protrusions 81 formed in a final blow mold 83 comprising blow mold sections 84 closeable on to a blown pre-form 85 illustrated in FIG. 15.

The pre-form 85 is blown in accordance with the techniques earlier discussed in connection with FIGS. 1 through 14, and it seems unnecessary to repeat the techniques at this time. It will be noted that the pre-form 85 has a pair of concave depressions 86 of a thickness greater than the thickness of the remainder of the pre-form, these concave depressions 86 being destined to form the convex projections 81 in the final bottle 80 and having the temperature characteristics of previously discussed pre-form portions 36.

From FIG. 16, it will be seen that the blown pre-form 85 is simply inflated interior of the blow mold sections 84, as heretofore described with the concave portions 86 of the blown pre-form 85 being blown outwardly to form the convex protrusions 81 at the conclusion of the blowing operation. In this way, it is possible to form protrusions 81 of a thickness greater than the thickness of the remainder of the bottle 85, if desired, the protrusions thus being reinforced for receiving a bail, hand band, handle, or the like.

From the foregoing detailed description of FIGS. 1 through 16, it will be readily appreciated that the present invention provides a novel method for the manufacture of plastic articles having shapes which are difficult to adequately form by previously known blowing techniques. Of particular value is the formation of the unique pre-form of the present invention from an easily and readily formed tubular parison. Such parisons can be made by either free extrusion or injection molding techniques and require no extensive tooling, matched mold sets, ovalized forming orifices or the like, as were necessary in the prior art. Further, the advantages of obtaining uniform wall thickness, or even localized increased wall thickness, if desired, can be readily appreciated, yet this wall thickness control is obtained by a simple pre-form blowing and final blowing combination. Additionally, the progressive inflation of the pre-form to its final shape and the stabilizing of the pre-form in the final blow mold cavity by such progressive inflation will also be appreciated.

I claim:

1. In a method of making a plastic article of non-circular cross-section having convex exterior portions from an essentially tubular parison, the steps of: (1) blowing the parison in a pre-form blow mold cavity into a pre-form in which the convex portions of the final bottle are defined by inverted concave pre-form portions which are hotter and thicker than the remainder of the pre-form (2) confining the pre-form in a final blow mold having a cavity conforming to the shape of the final article, and (3) inflating the pre-form in said cavity to (a) first conform the non-concave portions of the blown pre-form to a partial shape of the article, and (b) then to convert the concave portions of the pre-form to convex shapes completing the article, the wall thickness of the final non-concave and convex portions being substantially the same.

2. A method as defined in claim 1, wherein the performance of Step 3 thins the concave portions to a thickness substantially the same as that of the rest of the article.

3. A method as defined in claim 2, wherein the article is a polygonal container, the concave portions of the pre-form conform in location to the location of the container corners, and the performance of Step 3 forming the container corners only after the remainder of the container has been formed.

4. A method as defined in claim 1, wherein the article is an oval container having major and minor axes, the concave portions of the pre-form conform in location to the extremeties of the major axis of the container, and the performance of Step 3 forms the major axis extremeties only after the remainder of the container has been formed.

5. A method as defined in claim 1, wherein the article has localized protuberances at its exterior surface, the concave portions of the pre-form conform in location to the location of said protuberances and the performance of Step 3 forms the protuberances only after the remainder of the container has been formed.

6. In a method of making an article having a longitudinal central axis and peripheral portions spaced at varying distances from said axis, the steps of:
1. forming a tubular parison; (2) blowing said parison in a pre-form blow mold cavity into a blowable pre-form having peripheral portions corresponding to the locations of said portions of said article, those peripheral portions of said pre-form corresponding to those portions of said article more remote from said axis being (a) rounded inwardly toward the longitudinal axis of said pre-form, (b) lying generally closer to the longitudinal axis of said pre-form (c) having a substantially increased wall thickness as compared to the remainder of the pre-form, and (d) being hotter than the remainder of the pre-form; (3) coaxially aligning said pre-form in a final blow mold cavity having the shape of the final article, those peripheral portions of said pre-form which are (a) rounded inwardly, (b) closer to the common longitudinal axis, (c) of increased wall thickness and (d) hotter being aligned radially with the more remote portions of said cavity; and (4) blowing said pre-form in said final blow mold cavity to the shape of the final article, those thinner pre-form portions corresponding to the closer article portions contacting the blow mold cavity walls first to stabilize the pre-form in said cavity, and those thicker hotter, inwardly rounded pre-form portions closer to the pre-form axis expanding subsequently into contact with the cavity walls to form the more remote portions of the article.

7. In a method of making a blow molded plastic article having convex exterior peripheral portions remote from the longitudinal axis of the article and other portions less remote from said axis, the steps of:
(1) in a first blow mold cavity, blow molding a pre-form having a longitudinal axis corresponding to that of the article, those portions of said pre-form corresponding to the convex peripheral portions of said article being concave and of increased wall thickness and temperature relative to the remainder of said pre-form, and (2) in a second blow mold cavity, expanding said pre-form radially of said axis into said article, the concave pre-form portions being expanded to a degree greater than the remainder of said pre-form and the wall thickness of said concave portions being reduced during such expansion to substantially the same thickness as the remainder of the article.

8. A method as defined in claim 7, wherein the performance of Step 2 initially expands the non-concave portions of the pre-form to partially define the article, and then the concave portions of the pre-form are inflated to a convex configuration completing the definition of the article.

9. In a method of making a blown plastic article having convex portions at its periphery located a greater distance from the article longitudinal axis than the remainder of the article, the steps of:
   (1) in a pre-form mold cavity, blow molding a blowable pre-form of a shape departing materially from that of the article and wherein those preform portions destined to be subsequently blown into the convex portions of the articles are concave in shape, are closer to the longitudinal axis of the pre-form than the remainder of the pre-form, and are thicker and hotter than the remainder of the pre-form, (2) enclosing the blowable pre-form in a blow mold having walls defining a cavity conforming to the shape of the final article, the pre-form and cavity being longitudinally coaxial and the pre-form concave portions being radially aligned with the portions of the cavity against which the convex article portions are to be formed, and (3) in a single blow molding operation, (a) inflating the non-concave portions of the pre-form into contact with the blow mold walls, (b) inflating the concave portions of the pre-form to a convex shape bridging the wall contacting portions of the pre-form and (c) further inflating the now convex pre-form portions into contact with the blow mold to form the convex peripheral portions of the article, the wall thickness of the various portions of the final blown article being more uniform than the wall thickness of the blown pre-form.

10. A method as defined in claim 9, wherein the conversion of said concave pre-form portions to their final convex shape results in an article of substantially constant wall thickness throughout.

11. In a method of making a blown plastic article having convex portions at its periphery located a greater distance from the article longitudinal axis than the remainder of the article, the step of:
   (1) blow molding a blowable pre-form of a shape departing materially from that of the article and wherein those pre-form portions destined to be subsequently blown into the convex portions of the article are concave in shape and are both thicker and hotter than the remainder of the pre-form (2) enclosing the blowable pre-form in a blow mold having walls defining a cavity conforming to the shape of the final article, the pre-form and cavity being longitudinally coaxial and the pre-form concave portions being radially aligned with the portions of the cavity against which the convex article portions are to be formed, and (3) in a single blow molding operation, (a) inflating the non-concave portions of the pre-form into contact with the blow mold walls, (b) inflating the concave portions of the pre-form to a convex shape bridging the wall contacting portions of the pre-form and (c) further inflating the now convex pre-form portions into contact with the blow mold to form the convex peripheral portions of the article, the performance of step (3) forming a blown article having walls of substantially uniform thickness.

* * * * *